(12) United States Patent
Lee

(10) Patent No.: US 7,860,079 B2
(45) Date of Patent: Dec. 28, 2010

(54) METHOD AND APPARATUS TO PROTECT WIRELESS NETWORKS FROM UNSOLICITED PACKETS TRIGGERING RADIO RESOURCE CONSUMPTION

(75) Inventor: Michael Lee, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 624 days.

(21) Appl. No.: 11/870,616

(22) Filed: Oct. 11, 2007

(65) Prior Publication Data

US 2009/0097469 A1    Apr. 16, 2009

(51) Int. Cl.
*H04J 3/06* (2006.01)
(52) U.S. Cl. ...................................... 370/350
(58) Field of Classification Search .................. None
See application file for complete search history.

(56) References Cited

U.S. PATENT DOCUMENTS

| 6,061,341 | A * | 5/2000 | Andersson et al. .......... 370/338 |
| 7,114,182 | B2 * | 9/2006 | Robert et al. ................. 726/23 |
| 7,219,228 | B2 * | 5/2007 | Lin ............................ 713/160 |
| 7,254,133 | B2 * | 8/2007 | Govindarajan et al. ...... 370/394 |
| 7,257,840 | B2 * | 8/2007 | Ramaiah et al. ............. 370/235 |
| 7,483,990 | B2 * | 1/2009 | Baratakke et al. ........... 709/227 |
| 2006/0059551 | A1 * | 3/2006 | Borella ........................ 726/13 |
| 2007/0044150 | A1 * | 2/2007 | Dalal et al. .................. 726/22 |
| 2010/0107225 | A1 * | 4/2010 | Spencer et al. ................. 726/4 |

* cited by examiner

*Primary Examiner*—Anh-Vu Ly
(74) *Attorney, Agent, or Firm*—Christopher & Weisberg, P.A.

(57) ABSTRACT

A wireless communication method and wireless gateway device are provided for wireless communication between a wireless mobile station and a remote device. An unsolicited data packet is received from a remote device in which the data packet is addressed to the wireless mobile station. A determination is made as to whether to engage in a communication synchronization handshake with the remote device. The determination is based at least in part on the unsolicited data packet. A communication synchronization handshake with the remote device is performed without transmitting the received data packet to the mobile station upon determining to engage in a communication synchronization handshake with the remote device. A communication session is established with the wireless mobile station when the communication synchronization handshake with the remote device is successful. Data packets are forwarded between the wireless mobile station and the remote device when communication synchronization handshake with the remote device is successful and when communication with the wireless mobile station is established.

20 Claims, 5 Drawing Sheets

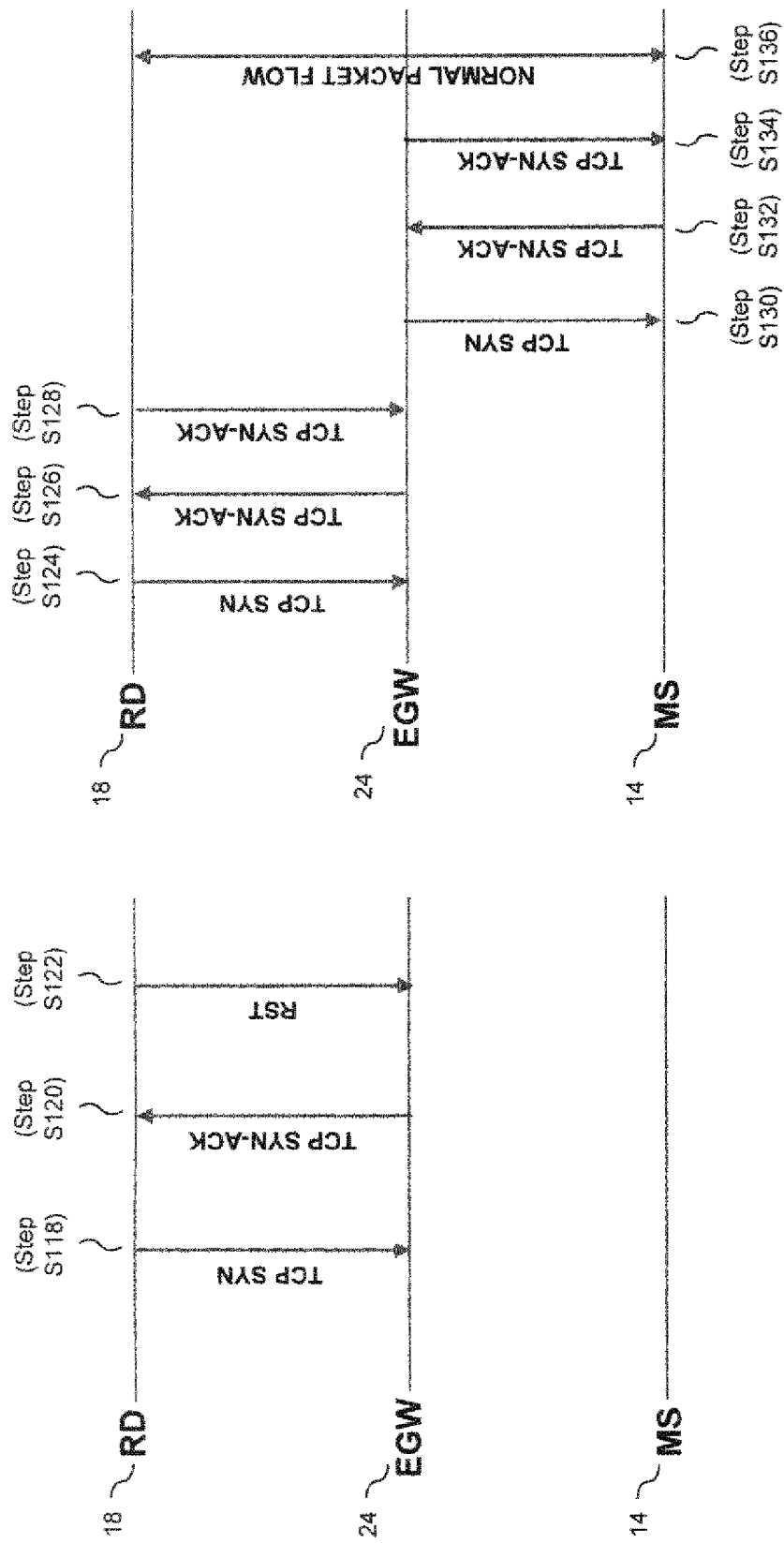

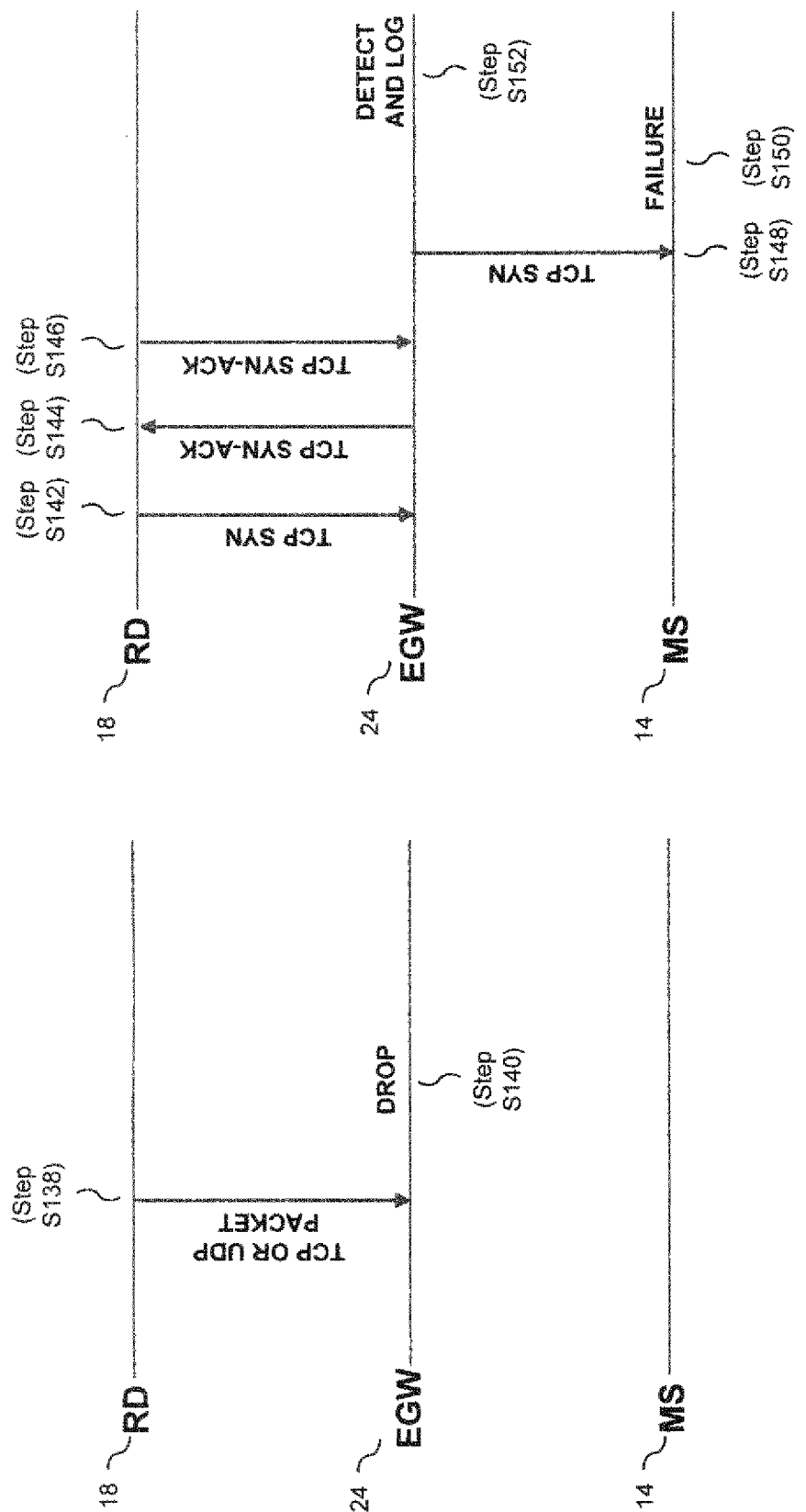

METHOD AND APPARATUS TO PROTECT WIRELESS NETWORKS FROM UNSOLICITED PACKETS TRIGGERING RADIO RESOURCE CONSUMPTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to wireless network communications and particular to a method and device that monitors and filters downlink data packets to minimize the unnecessary consumption of wireless communication system radio resources.

BACKGROUND OF THE INVENTION

Certain types of wireless communication networks, e.g., orthogonal frequency division multiplexed ("OFDM") networks, are used to support cell-based high speed services such as those under certain standards such as the 3rd Generation Partnership Project ("3GPP") and 3GPP2 evolutions, e.g., Long Term Evolution ("LTE"), the Ultra-Mobile Broadband ("UMB") broadband wireless standard and the IEEE 802.16 standards. The IEEE 802.16 standards are often referred to as WiMAX or less commonly as WirelessMAN or the Air Interface Standard. Wireless communication networks, such as cellular networks, operate by sharing resources among the mobile terminals operating in the communication network. As part of the sharing process, base stations and wireless gateways support wireless communications in a cell or region with multiple mobile terminals.

Because radio resources are shared and are finite, it is desirable to minimize the amount of unnecessary communications on the wireless radio network. Such unnecessary wireless communications can result in wireless data communication environments where some third party device transmits unsolicited packets intended to probe mobile terminals or otherwise disrupt communications with the mobile terminals. These undesired and unsolicited communications can take the form of transmission control protocol/internet protocol ("TCP/IP") packets.

For example, "always on" data subscribers using mobile stations have active and dormant point-to-point protocol ("PPP") sessions or sessions similar in function based on other similar protocols. These PPP sessions are active when a mobile terminal sends data and stay active for a period of time after which the PPP session will go dormant. These sessions are typically maintained in a dormant state so that subscribers' mobile terminals do not consume battery power and so that the wireless network is not consuming unnecessary radio resources. When a mobile station receives data network "push services" where data is automatically sent to the mobile station without a specific request packet will quickly have access to these services, the PPP session becomes active and will stay active for a period of time. Examples of valid "push services" include carrier supplied, enterprise specific and subscriber initiated push services.

Those wishing to attack the wireless networks are aware of this arrangement and transmit unsolicited packets, such as port scan packets, that wake up the dormant PPP sessions and consume radio resources. In addition, those wishing to gather information from a network may also transmit port scan packets or other packets, unaware that the terminating network is a mobile network, and this also wakes up dormant PPP sessions and consumes radio resources. A "port scan" is a method used by an attacker to determine what services are running on a device or network. When conducting a "port scan," an attacker transmits requests on different TCP/IP logical ports and takes note of which ports respond in certain way. TCP/IP logical ports typically map to applications so an attacker who knows which applications are accessible can use this information to map its attacks. Accordingly, not only are port scans wasteful of radio resources, they are also potentially harmful to the mobile station.

Examples of such undesired and potentially disruptive communications are discussed with reference to the prior art system shown in FIG. 1. FIG. 1 shows a prior art system 10 in which a wireless gateway 12 is used to facilitate communications between mobile station 14 served by carrier wireless network 16, and remote device 18 on Internet 20. Wireless gateway 12 includes hardware and software known in the art to route data packets, such as TCP/IP packets, sent from remote device 18 to mobile station 14, and vice versa. In operation, wireless gateway 12 receives a data packet transmitted by remote device 18 over Internet 20 and passes the packet along to carrier wireless network 16 for transmission to mobile station 14. Examples of wireless gateway 12 include Gateway General Packet Radio Service Support Nodes ("GGSN"), a Packet Data Serving Node ("PDSN") and an Access Gateway ("AGW"). A GGSN is a network node that works as a gateway between a General Packet Radio Service ("GPRS") wireless data network and other networks such as a private network or the Internet. PDSNs are typically used between Internet 20 and cdma2000 and other code division multiple access ("CDMA")-based carrier wireless networks 16. AGWs are used to provide access between Internet 20 and multi-service wireless networks, WiMax networks and wireless LANs.

Carrier wireless network 16 includes base stations (not shown), authentication, authorization and accounting ("AAA") servers (not shown), and other devices known in the art to provide wireless communications from wireless gateway 12 to mobile station 14. Implementations of carrier wireless networks 16 include different components depending on the technology of the carrier wireless network, e.g., CDMA vs. global system for mobile ("GSM") vs. universal mobile telephone system ("UMTS") vs. WiMAX.

Mobile station 14 can be any mobile station known in the art that is capable of engaging in wireless data communications with gateway 12 via a supporting carrier wireless network 16. Such devices include but are not limited to mobile phones, portable computing devices, stationary computing devices equipped with wireless communication network interface hardware and software, smartphones, personal digital assistants ("PDAs"). Mobile station 14 includes the software, firmware and hardware, such as a central processing unit, volatile and non-volatile storage, user interface, display and communication circuitry to engage, in wireless communications using carrier wireless network 16. Remote device 18 can be any computing device known in the art that is capable of transmitting and receiving a data packet, such as a TCP/IP packet, via Internet 20.

Exemplary undesirable known operation in which systems 10 facilitate port scanning in a manner which wastes and consumes wireless network resources on carrier wireless network 16 and, as a result, battery and processing resources on mobile station 14 is described with reference to FIG. 2. In traditional and valid TCP connection establishment, a three-way handshake is used in which remote device 18 transmits a TCP SYN packet to mobile station 14. Mobile station 14 responds with a TCP SYN-ACK acknowledgement packet to which remote device 18 responds with its own acknowledgement, often referred to as a TCP SYN-ACK-ACK packet. In such a case, gateway 12 merely passively passes packets between remote device 18 and mobile terminal 14 without regard to intent.

However, in a port scanning operation such as is shown in FIG. 2, merely passing packets between remote device 18 and mobile terminal 14 results in a waste of carrier wireless network 16 resources. Initially, remote device 18 transmits TCP SYN packet destined for mobile station 14 (step S100). Gateway 12 receives the TCP SYN packet (step S100) and transmits the TCP SYN packet to mobile station 14 (step S102) via carrier wireless network 16. Not knowing that the TCP SYN packet is intended merely as a port scan, mobile station 14 awakens if it is dormant and transmits a TCP SYN packet back to gateway 12 (step S104). Having no knowledge of the port scanning intent, gateway 12 then transmits the TCP SYN packet to remote device 18 (step S106). The malicious port scanning complete, remote device 18 either does nothing further with respect to mobile station 14 and leaves the three-way handshake incomplete, or transmits a reset ("RST") packet (step S108) which is received by gateway 12 and, in a further waste of carrier wireless network 16 resources, transmitted in turn to mobile station 14 (step S110). It is therefore desirable to have an arrangement under which port scanning can be blocked to prevent the unnecessary consumption of wireless network resources.

As another example, remote device 18 may not even attempt malicious communication through the veil of an aborted port scan. Remote device 18 may simply send an unsolicited packet that is not a session establishment, e.g., TCP SYN, packet. An example of such communication and its resultant waste of carrier wireless network 16 radio resources is explained with reference to FIG. 3. Initially, remote device 18 transmits a TCP, connectionless user datagram protocol ("UDP") or other unsolicited data packet addressed to mobile station 14 (step S112). Gateway 12 receives this data packet and simply forwards it without analysis to mobile station 14 (step S114). Mobile station 14 receives the data packet and, because the packet is either not for a service supported by mobile station 14, or not based on a validly established connection and communication session, drops the packet (step S116). Under this arrangement, wireless radio resources are consumed unnecessarily due to the transmission of the packet from wireless gateway 12 to mobile station 14. Further, if mobile station 14 was dormant, it was unnecessarily awakened, thereby causing the wasteful consumption of battery power. It is therefore desirable to have an arrangement under which unsolicited packets are evaluated and dropped prior to transmission to mobile station 14.

SUMMARY OF THE INVENTION

The present invention advantageously provides a method and apparatus for wireless communication that conserves wireless communication network radio resources by responding to remote device communication and session connection requests prior to transmission on the wireless communication network. The present invention allows dormant mobile stations to remain in a dormant state, thereby conserving radio and battery resources until actual communication with the mobile device is warranted. The present invention also advantageously allows operation with existing mobile stations, thereby obviating the need for expensive and time consume retrofitting, updating or upgrading. In addition, the present invention advantageously allows operation with existing push data services and supported data service equipment, thereby obviating the need for expensive and time consuming retrofitting, updating or upgrading.

In accordance with one aspect, the present invention provides a method for wireless communication between a wireless mobile station and a remote device. An unsolicited data packet is received from a remote device in which the data packet is addressed to the wireless mobile station. A determination is made as to whether to engage in a communication synchronization handshake with the remote device. The determination is based at least in part on the unsolicited data packet. A communication synchronization handshake with the remote device is performed without transmitting the received data packet to the mobile station upon determining to engage in a communication synchronization handshake with the remote device. A communication session is established with the wireless mobile station when the communication synchronization handshake with the remote device is successful. Data packets are forwarded between the wireless mobile station and the remote device when communication synchronization handshake with the remote device is successful and when communication with the wireless mobile station is established.

In accordance with another aspect, the present invention provides a gateway apparatus for data communication between a remote device and a wireless mobile station. At least one communication interface receives a data packet from the remote device in which the data packet being is to a wireless mobile station. A central processing unit is in communication with the at least one communication interface. The central processing unit operates to determine whether to engage in a communication synchronization handshake with the remote device. The determination is based at least in part on the unsolicited data packet. The central processing unit uses the at least one communication interface to engage in a communication synchronization handshake with the remote device without transmitting the received data packet to the mobile station upon determining to engage in a communication synchronization handshake with the remote device, establish a communication session with the wireless mobile station when the communication synchronization handshake with the remote device is successful and forward data packets between the wireless mobile station and the remote device when communication synchronization handshake with the remote device is successful and when communication with the wireless mobile station is established.

In accordance with still another aspect, the present invention provides a storage medium storing programmatic code that when executed by a computing device performs a method for wireless communication between a wireless mobile station and a remote device. An unsolicited data packet is received from a remote device in which the data packet is addressed to the wireless mobile station. A determination is made as to whether to engage in a communication synchronization handshake with the remote device. The determination is based at least in part on the unsolicited data packet. A communication synchronization handshake with the remote device is performed without transmitting the received data packet to the mobile station upon determining to engage in a communication synchronization handshake with the remote device. A communication session is established with the wireless mobile station when the communication synchronization handshake with the remote device is successful. Data packets are forwarded between the wireless mobile station and the remote device when communication synchronization handshake with the remote device is successful and when communication with the wireless mobile station is established.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is a data flow diagram showing port scanning resource consumption in accordance with the principles of the present invention;

FIG. 6 is a data flow diagram showing resource consumption for valid services in accordance with the principles of the present invention;

FIG. 7 is a data flow diagram showing resource consumption for unsolicited packets in accordance with the principles of the present invention; and FIG. 8 is a data flow diagram showing resource consumption for deliberate attacks.

DETAILED DESCRIPTION OF THE INVENTION

As an initial matter, it is noted that the present invention can be implemented in any wireless communication network, including but not limited to wireless networks operating in accordance with the Ultra-Mobile Broadband ("UMB") broadband wireless standard, which is hereby incorporated by reference, the invention is not limited in this regard and may be applicable to other broadband networks including those operating in accordance with other OFDM orthogonal frequency division ("OFDM")-based systems including other WiMAX (IEEE 802.16) and 3rd Generation Partnership Project ("3GPP") evolution, e.g., Long Term Evolution ("LTE"), etc. Similarly, the present invention is not limited solely to OFDM-based systems and can be implemented in accordance with other system technologies, e.g., CDMA. In sum, any wireless communication network can be used to support the present invention. Similarly, while the present invention is discussed in terms of the transmission control protocol/internet protocol ("TCP/IP"), the invention is not limited to such and use of TCP/IP is merely exemplary. It is understood that any connection-based or connectionless protocol can be supported by the present invention.

As used herein, the term "unsolicited data packet" refers to any data packet transmitted from a remote device to a mobile station that is not based on some prior request by the mobile station or based on an established communication session. As such an unsolicited data packet is not limited solely to a packet having user data, and can include session establishment requests such as communication session handshake data, e.g., TCP SYN packets.

Figure 1:
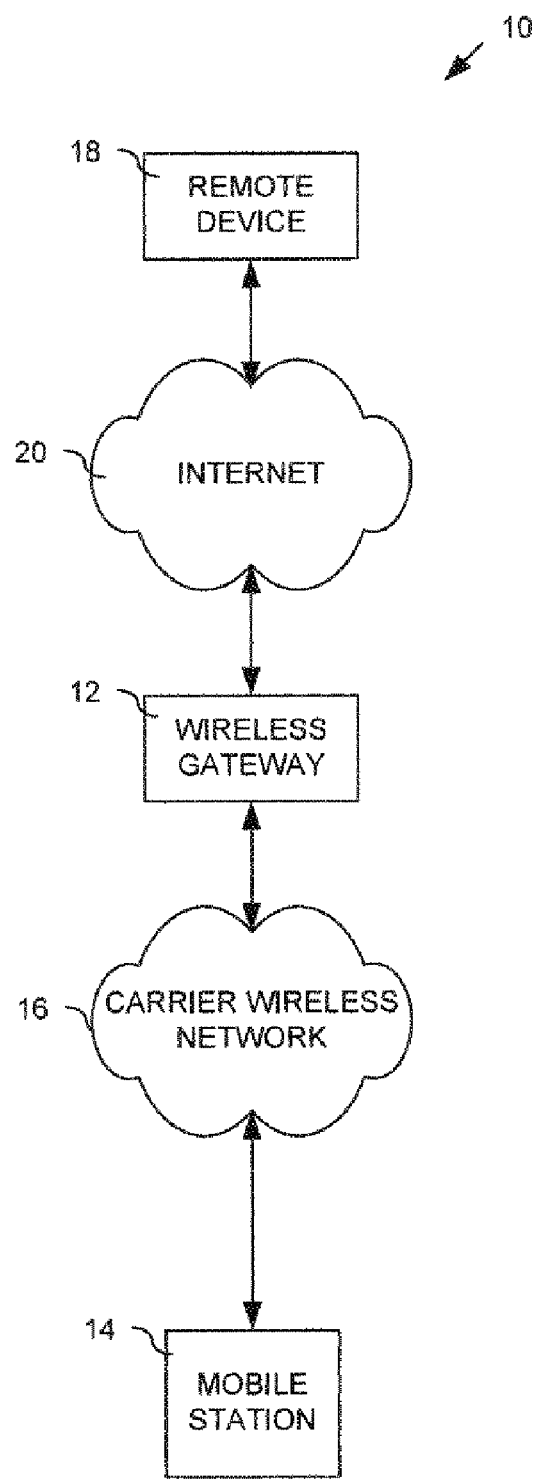
FIG. 1 is a block diagram of a prior art wireless communication system.
Figures 2, 3:
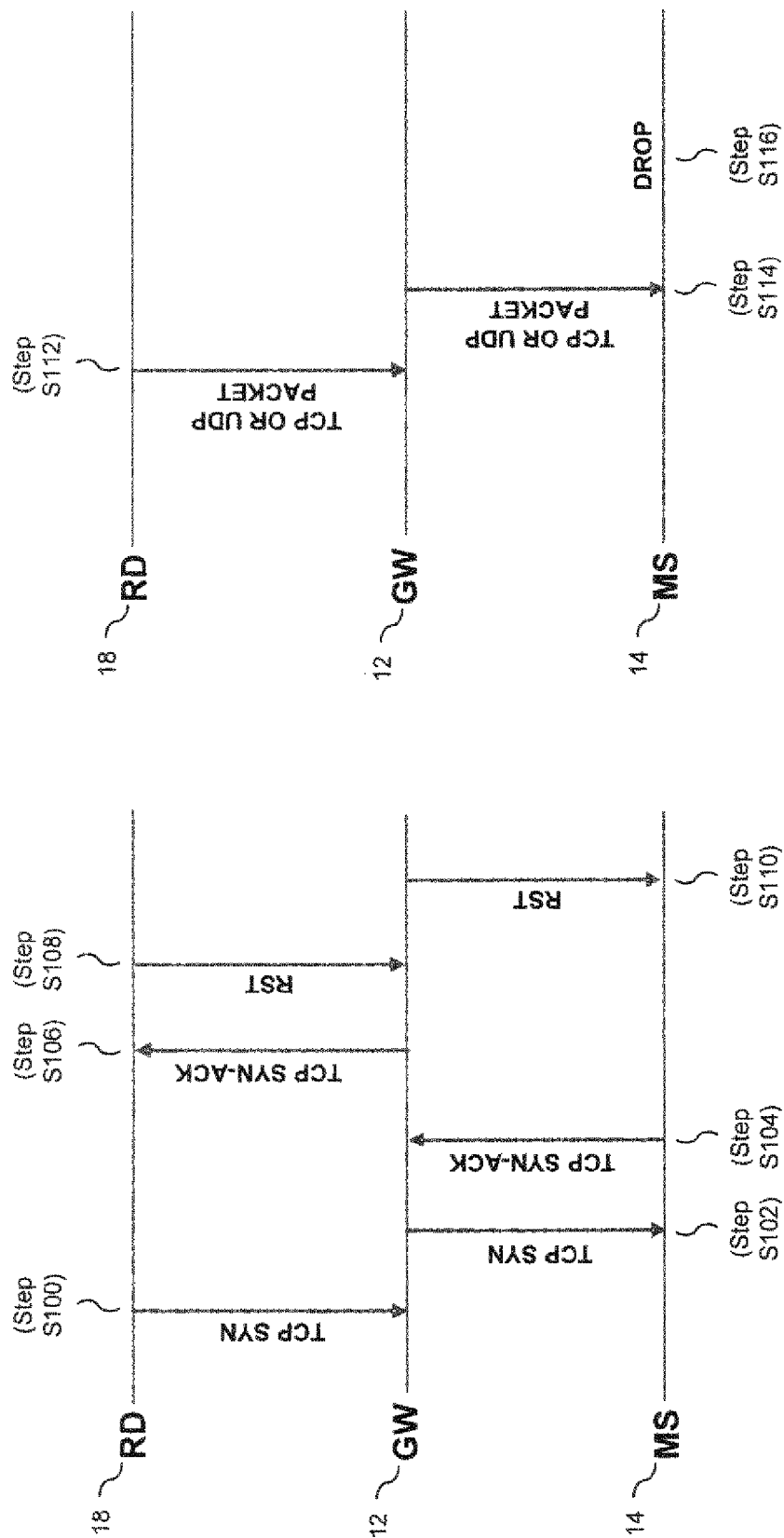
FIG. 2 is a data flow diagram of a prior art port scanning method.
FIG. 3 is a data flow diagram of a prior art unsolicited packet transmission method.
Figure 4:
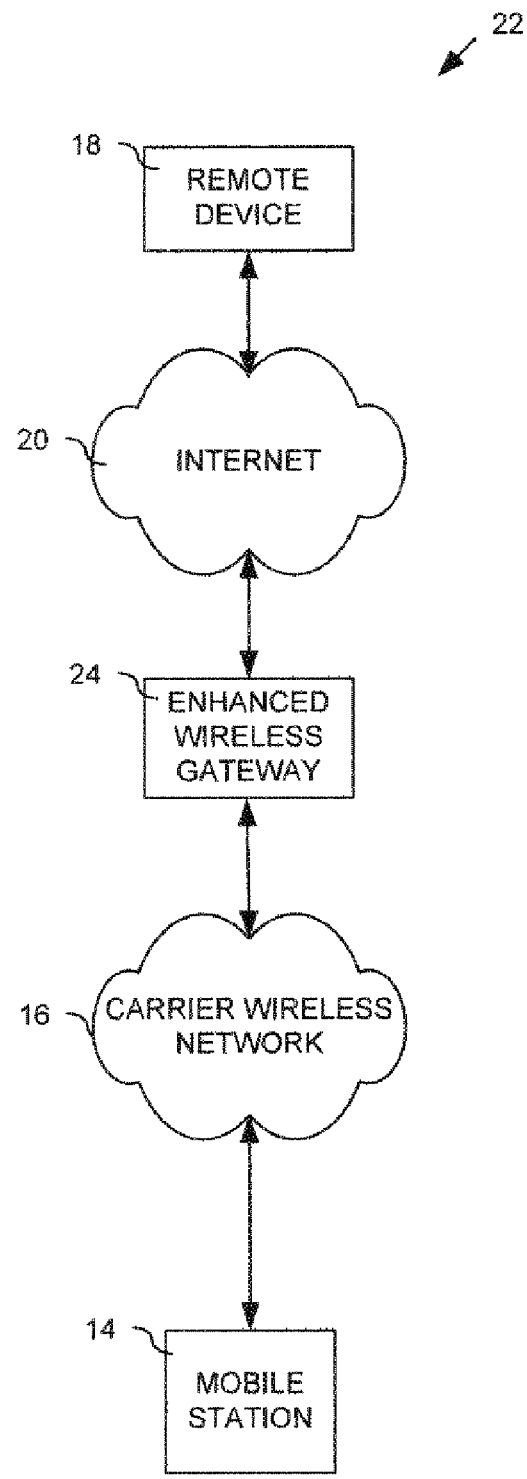
FIG. 4 is a block diagram of an exemplary wireless communication system constructed in accordance with the principles of the present invention.

Referring now to the drawing figures in which like reference designators refer to like elements, there is shown in FIG. 4, a system constructed in accordance with the principles of the present invention and designated generally as "22." System 22 can include the mobile station 14, carrier wireless network 16, internet 20 and remote device 18 discussed above. In other words, the present invention advantageously supports these devices in unaltered format in a manner that is transparent to these devices. System 22 also includes enhanced wireless gateway ("EGW") 24, arranged to perform intelligent packet filtering in accordance with the present invention as described herein. This allows existing implementations to be retrofitted with enhanced wireless gateway 24.

Enhanced wireless gateway 24 includes a central processing unit (not shown) to control and/or perform the functions described here. Enhanced wireless gateway 24 also includes one or more communication interfaces (not shown) which are in electrical communication with the central processing unit and are used to transmit and receive data packets to external devices and networks. For example, such communication interfaces are used to communicate with remote device 18 via Internet 20 and with mobile station 14 via carrier wireless network 16. It is contemplated that the communication interfaces can provide wireless or hard-wired communications with the external devices and networks. Although shown in FIG. 4 as separate connections to carrier wireless network 16 and Internet 20, it is also contemplated that a single communication interface can be used to communicate with carrier wireless network 16 and Internet 20.

In operation, enhanced wireless gateway 24 receives an unsolicited data packet from remote device 18. Typically, the data packet is addressed to mobile station 14. Enhanced wireless gateway 24 evaluates the received unsolicited data packet and determines whether to engage in a communication synchronization handshake with remote device 18. In other words, enhanced wireless gateway 24 intercepts the inbound packet and, rather than simply forwarding it to mobile station 14 via carrier wireless network 16, enhanced wireless gateway 24 decides whether to assume the handshake roll and make it appear to remote device 18 that remote device 18 is actually communicating with its target, mobile station 14.

The determination is based at least in part on the nature of the unsolicited data packet. In other words, if the received unsolicited data packet is not even for a synchronization handshake for the establishment of a communication session, a determination is made that no handshake is needed. If a determination is made that communication synchronization handshake with remote device 18 is warranted, enhanced wireless gateway 24 engages in such synchronization. If communication synchronization handshaking with remote device 18 is successful, it can be reasonably assumed that remote device 18 is not engaged in a port scan and is instead being forthright. As such, enhanced wireless gateway can attempt to establish a corresponding communication session with mobile station 14 to facilitate communication directly between remote device 18 and mobile station 14 and forward data packets between these devices.

Examples of the operation of enhanced wireless gateway 24 are described with reference to FIGS. 5-8. FIG. 5 is a data flow diagram showing the operation of enhanced wireless gateway 24 in an attempted port scanning scenario. Initially, remote device 18 sends a handshake request in the form of a TCP SYN packet having a destination address corresponding to mobile station 14 (step S118). This packet is received by enhanced gateway 24. Rather than simply and blindly forwarding the received packet to mobile station 14, enhanced gateway 24 assumes the handshake role and transmit a TCP SYN-ACK packet back to remote device 18 (step S120). In a port scanning scenario, remote device 18 will either take no further action or transmit a reset ("RST") packet (step S122). Advantageously, because enhanced gateway 24 engaged in a communication handshake with remote device 18 without transmitting the initially received data packet to mobile station 14, wireless radio resources on carrier wireless network 16 are preserved and mobile station 14, being unaware of the malicious port scan, is not contacted and can therefore remain in its current state, e.g., dormant.

FIG. 6 is an exemplary data flow diagram showing resource consumption and operation of enhanced gateway 24 for valid services. Initially, remote device 18 seeking to engage in legitimate communication with mobile station 14 transmits an unsolicited TCP SYN handshake data packet addressed to mobile station 14 (step S124). Enhanced gateway 24 receives this packet and, without forwarding the packet to mobile station 14, responds to remote device 18 by transmitting a TCP SYN-ACK packet (step S126). In response, remote device 18 completes the three-way handshake by transmitting its own TCP SYN-ACK acknowledgement packet (step S128). At this point, enhanced gateway 24 has completed its handshake with remote device 18 and has determined that the synchronization handshake is successful.

Enhanced gateway 24 then facilitates the three-way handshake synchronization between itself and mobile station 14 by transmitting a new TCP SYN to mobile station 14 (step S130). In other words, enhanced gateway 24 transmits a new TCP SYN packet. Mobile station 14 receives the TCP SYN and responds with its own TCP SYN-ACK data packet (step S132). Enhanced gateway 24 receives the TCP SYN-ACK packet and transmits its own TCP SYN-ACK to mobile station 14 (step S134), thus establishing synchronization between enhanced gateway 24 and mobile station 14. At this point, a communication session between remote device 18 and enhanced gateway 24 has been established, and a communication session between enhanced gateway 24 and mobile station 14 has also been established. Packet flow occurs (step S136) between remote device 18 and enhanced gateway 24, and the packet flow is relayed between enhanced gateway 24 and mobile station 14. Enhanced gateway 24 maintains two TCP session stacks of packet flow and relays the received and transmitted packets between remote device 18 and mobile station 14, thus simulating normal packet flow from the perspectives of both remote device 18 and mobile station 14. Normal packet flow refers to the forwarding of data packets by enhanced gateway 24 between remote device 18 and mobile station 14.

The present invention advantageously provides an arrangement by which unsolicited non-handshake based data packets, such as unsolicited UDP or TCP packets, addressed directly to mobile station 14 are analyzed by enhanced gateway 24 and dropped prior to transmission to mobile station 14. An example as explained with reference to FIG. 7. FIG. 7 is a data flow diagram showing resource consumption and enhanced gateway 24 operation for unsolicited packets other than synchronization handshake packets. Initially, the enhanced gateway 24 receives a TCP or UDP packet addressed to mobile station 14 (step S138). Because no communication session has previously been established between remote device 18 and mobile station 14, enhanced gateway 24 drops the unsolicited received packet (step S140). As such, in accordance with the present invention, enhanced gateway 24 prevents the unnecessary consumption of wireless network radio resources because the unsolicited TCP or UDP data packet is not transmitted to mobile station 14 across carrier wireless network 16.

The present invention also advantageously provides an embodiment in which enhanced gateway 24 operates to repel deliberate attacks, even where the initial three-way synchronization handshake is completed. Such an example is shown and described with reference to FIG. 8. An example of deliberate attacks may be where the remote device 18 seeks to start a malicious service or obtain data from mobile station 14 through the post-handshake transmission of a request using a logical port for a corresponding service that is not supported by mobile station 14.

As part of the three-way synchronization handshake process described above with respect to valid service support, remote device 18 transmits a TCP SYN data packet addressed to mobile station 14 (step S142). This packet is received by enhanced gateway 24 and is not forwarded to mobile station 14. Instead, as discussed above, enhanced gateway 24 transmits a TCP SYN-ACK data packet to remote device 18 (step S144). As expected, remote device 18 transmits a TCP SYN-ACK acknowledgement packet to mobile station 14 which is intercepted by enhanced gateway 24 (step S146). A valid three-way synchronization handshake being complete, enhance gateway 24 forwards and/or transmits a TCP SYN data packet corresponding to the packet in step S142 to mobile station 14 (step S148). However, in this case, the logical port is not supported by mobile station 14, so the subsequent attempt at establishing a communication session with mobile station 14 fails (step S150). Enhanced gateway 24 detects and can log this failure (step S152). Such detection and logging may include, for example, an entry in a data base on or accessible by enhanced gateway 24 that the particular service and/or logical port number attempted for communication is not valid. In this manner, enhanced gateway 24 can block the establishment of any future communication sessions between remote device 18 and mobile station 14. Such blockage can be based on any attempt to establish communication between remote device 18 and mobile station 14 or can be limited to attempts to establish a communication session between remote device 18 and mobile station 14 for the same service. Similarly, because enhanced gateway 24 has knowledge that mobile station 14 does not support that service, enhanced gateway 24 can operate to block connection attempts between any remote device 18 and mobile station 14 seeking to evoke that same service. Enhanced gateway 24 may learn what services are supported by mobile station 14 by monitoring, recording and/or logging sessions that are established by mobile station 14. In this manner, enhanced gateway 24 may intelligently respond to service connection requests from remote device 18 for services that are supported by mobile station 14.

As still another example, by logging detected failures, enhanced gateway 24 can block the establishment of future communication sessions between the remote device 18 and mobile station 14 in the case where a quantity of the logged detected failures exceeds a predetermined amount. In this case, an allowance can be made for an isolated few errant communication attempts without blocking all subsequent communication session requests originating from remote device 18. By establishing a threshold attempt value, a determination can be made that communication attempts exceeding that value are of malicious intent.

The present invention advantageously provides a method and enhanced gateway device which evaluates unsolicited packets transmitted by remote and serves as a three-way-handshake synchronization proxy to avoid the potentially unnecessary waste of wireless radio network resources. The enhanced gateway can also monitor attempts to circumvent the handshake process and block direct communication session attempts originating from a malicious remote device. In addition, the present invention provides an arrangement under which enhanced gateway 24 can monitor and log service initiation failures on mobile station 14 to prevent future attempts by the same remote device and/or for the same service from unnecessarily consuming wireless communication network radio resources.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for wireless communication between a wireless mobile station and a remote device, the method comprising:
   receiving an unsolicited data packet from a remote device, the data packet being addressed to the wireless mobile station;
   determining whether to engage in a communication synchronization handshake with the remote device, the determination being based at least in part on the unsolicited data packet;
   engaging in a communication synchronization handshake with the remote device without transmitting the received data packet to the mobile station upon determining to engage in a communication synchronization handshake with the remote device;
   establishing a communication session with the wireless mobile station when the communication synchronization handshake with the remote device is successful; and
   forwarding data packets between the wireless mobile station and the remote device when communication synchronization handshake with the remote device is successful and when communication with the wireless mobile station is established.

2. The method of claim 1, wherein the communication synchronization handshake is a TCP handshake.

3. The method of claim 2, wherein the received unsolicited data packet is a TCP SYN packet, wherein successfully engaging in a communication synchronization handshake with the remote device includes transmitting a TCP SYN-ACK packet to the remote device and receiving an acknowledgement thereto.

4. The method of claim 1, wherein it is determined not to engage in a communication synchronization handshake with the remote device when the received unsolicited data packet is not a communication synchronization handshake packet, and wherein the method further comprises dropping the received unsolicited data packet.

5. The method of claim 4, wherein the received unsolicited data packet is a UDP packet.

6. The method of claim 1, further comprising:
   monitoring logical communication ports used by the mobile station; and
   blocking the establishment of the communication session when the communication session corresponds to a port other than logical communication ports used by the mobile station.

7. The method of claim 1, further comprising:
   detecting failure of establishment of the communication session between the mobile station and the remote device, the failure being based on lack of support by the mobile station for a service corresponding to the communication session; and
   blocking the establishment of a future communication session between the remote device and the mobile station.

8. The method of claim 7, further comprising:
   logging the detected failure; and
   blocking the establishment of future communication sessions between the remote device and the mobile station when a quantity of logged detected failures exceeds a predetermined amount.

9. A gateway apparatus providing data communication between a remote device and a wireless mobile station, the apparatus comprising:
   at least one communication interface receiving an unsolicited data packet from the remote device, the unsolicited data packet being addressed to a wireless mobile station; and
   a central processing unit in communication with the at least one communication interface, the central processing unit operating to determine whether to engage in a communication synchronization handshake with the remote device, the determination being based at least in part on the unsolicited data packet, the central processing unit using the at least one communication interface to:
      engage in a communication synchronization handshake with the remote device without transmitting the received unsolicited data packet to the mobile station upon determining to engage in a communication synchronization handshake with the remote device;

establish a communication session with the wireless mobile station when the communication synchronization handshake with the remote device is successful; and forward data packets between the wireless mobile station and the remote device when communication synchronization handshake with the remote device is successful and when communication with the wireless mobile station is established.

10. The apparatus of claim 9, wherein the communication synchronization handshake is a TCP handshake.

11. The apparatus of claim 10, wherein the received unsolicited data packet is a TCP SYN packet, wherein successfully engaging in a communication synchronization handshake with the remote device includes transmitting a TCP SYN-ACK packet to the remote device and receiving an acknowledgement thereto.

12. The apparatus of claim 9, wherein it is determined not to engage in a communication synchronization handshake with the remote device when the received unsolicited data packet is not a communication synchronization handshake packet, and wherein the central processing unit drops the received unsolicited data packet.

13. The apparatus of claim 9, wherein the central processing unit further operates to:

monitor logical communication ports used by the mobile station; and block the establishment of the communication session when the communication session corresponds to a port other than logical communication ports used by the mobile station.

14. The apparatus of claim 9 wherein the central processing unit further operates to:

detect failure of establishment of the communication session between the mobile station and the remote device, the failure being based on lack of support by the mobile terminal station for a service corresponding to the communication session; and block the establishment of a future communication session between the remote device and the mobile station.

15. The apparatus of claim 14, wherein the central processing unit further operates to:

log the detected failure; and block the establishment of future communication sessions between the remote device and the mobile station when a quantity of logged detected failures exceeds a predetermined amount.

16. A storage medium storing computer executable code that when executed by a computing device performs a method for wireless communication between a wireless mobile station and a remote device, the method comprising:

receiving an unsolicited data packet from a remote device, the data packet being addressed to the wireless mobile station;

determining whether to engage in a communication synchronization handshake with the remote device, the determination being based at least in part on the unsolicited data packet;

engaging in a communication synchronization handshake with the remote device without transmitting the received data packet to the mobile station upon determining to engage in a communication synchronization handshake with the remote device;

establishing a communication session with the wireless mobile station when the communication synchronization handshake with the remote device is successful; and forwarding data packets between the wireless mobile station and the remote device when communication synchronization handshake with the remote device is successful and when communication with the wireless mobile station is established.

17. The storage medium of claim 16, wherein the received unsolicited data packet is a TCP SYN packet, wherein successfully engaging in a communication synchronization handshake with the remote device includes transmitting a TCP SYN-ACK packet to the remote device and receiving an acknowledgement thereto.

18. The storage medium of claim 16, wherein it is determined not to engage in a communication synchronization handshake with the remote device when the received unsolicited data packet is not a communication synchronization handshake packet, and wherein the method further comprises dropping the received unsolicited data packet.

19. The storage medium of claim 16, further comprising:

monitoring logical communication ports used by the mobile station; and blocking the establishment of the communication session when the communication session corresponds to a port other than logical communication ports used by the mobile station.

20. The storage medium of claim 19, further comprising:

detecting failure of establishment of the communication session between the mobile station and the remote device, the failure being based on lack of support by the mobile terminal for a service corresponding to the communication session; and blocking the establishment of a future communication session between the remote device and the mobile station.

* * * * *

UNITED STATES PATENT AND TRADEMARK OFFICE
CERTIFICATE OF CORRECTION

PATENT NO. : 7,860,079 B2
APPLICATION NO. : 11/870616
DATED : December 28, 2010
INVENTOR(S) : Michael Lee It is certified that error appears in the above-identified patent and that said Letters Patent is hereby corrected as shown below:

In Column 11, line 38, Claim 14, delete "terminal".

Signed and Sealed this
Thirteenth Day of September, 2011

David J. Kappos
*Director of the United States Patent and Trademark Office*